United States Patent [19]

Heise et al.

[11] Patent Number: 5,894,533

[45] Date of Patent: Apr. 13, 1999

[54] DEVICE FOR WAVELENGTH-RELATED STABILIZATION OF AN OPTICAL FILTER

[75] Inventors: Gerhard Heise, Munich; Achim Reichelt, Unterhaching; Herbert Michel; Reinhard Maerz, both of Munich, all of Germany

[73] Assignee: Siemens Aktiengesellschaft, Munich, Germany

[21] Appl. No.: 08/812,239

[22] Filed: Mar. 6, 1997

[30] Foreign Application Priority Data

Mar. 6, 1996 [DE] Germany ............... 196 08 732

[51] Int. Cl.[6] .................................................. G02B 6/293
[52] U.S. Cl. .................................. 385/14; 385/27; 385/37
[58] Field of Search ........................... 385/14, 15, 27, 385/39, 37

[56] References Cited

U.S. PATENT DOCUMENTS

| | | | |
|---|---|---|---|
| 5,581,642 | 12/1996 | Deacon et al. | 385/15 |
| 5,629,992 | 5/1997 | Amersfoort et al. | 385/15 |
| 5,691,989 | 11/1997 | Rakuljic et al. | 372/20 |

*Primary Examiner*—John D. Lee
*Attorney, Agent, or Firm*—Hill & Simpson

[57] ABSTRACT

A device for the wavelength-related stabilization of an optical filter, particularly a wavelength-division multiplexer/demultiplexer, comprises a Bragg grating arranged in the proximity of the filter and a waveguide for supplying a fixed optical reference wavelength to the grating. The grating is regulated to either a maximum transmission and minimum reflection or a minimum transmission and maximum reflection of the reference wavelength by controlling the temperature of the grating and of the filter.

10 Claims, 2 Drawing Sheets

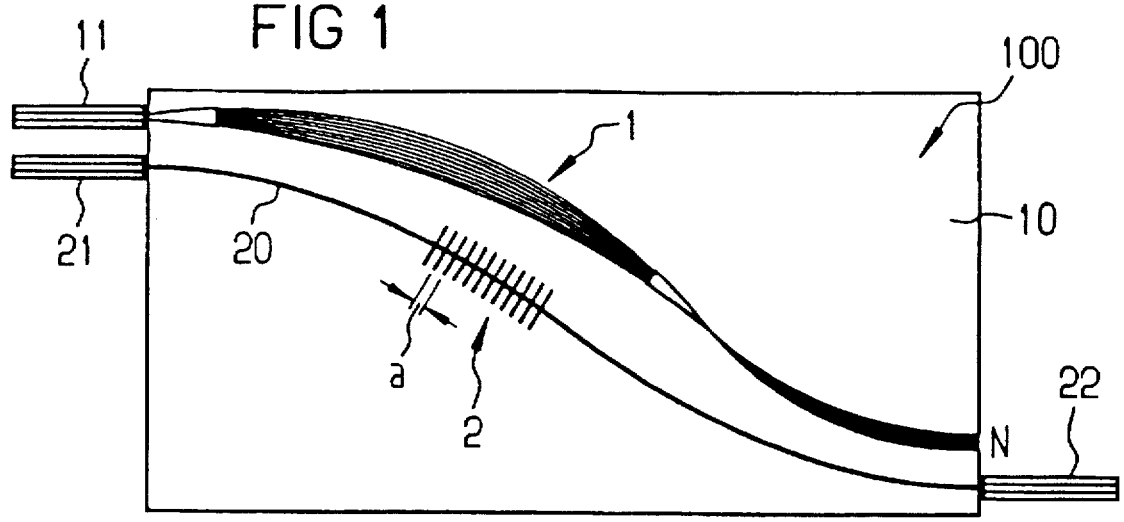
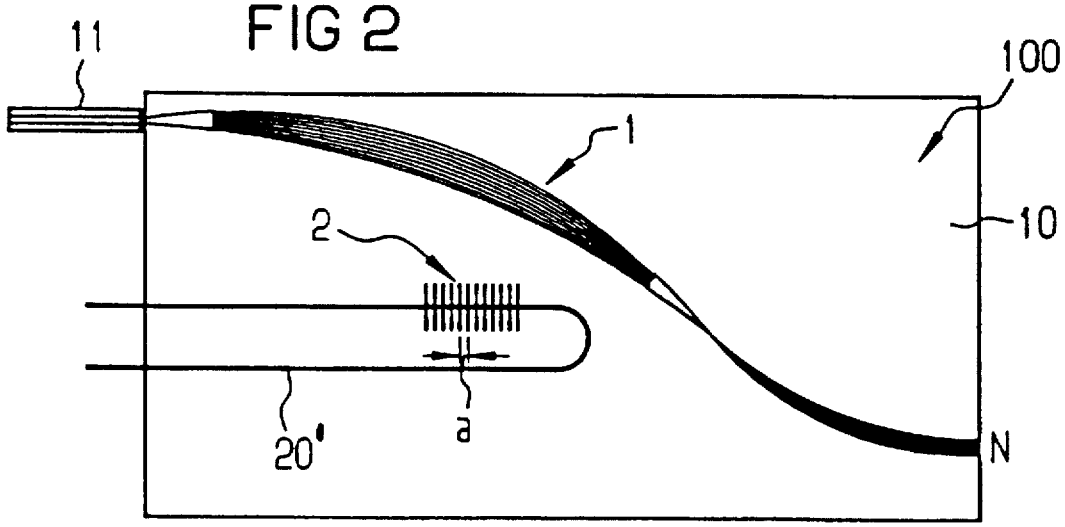

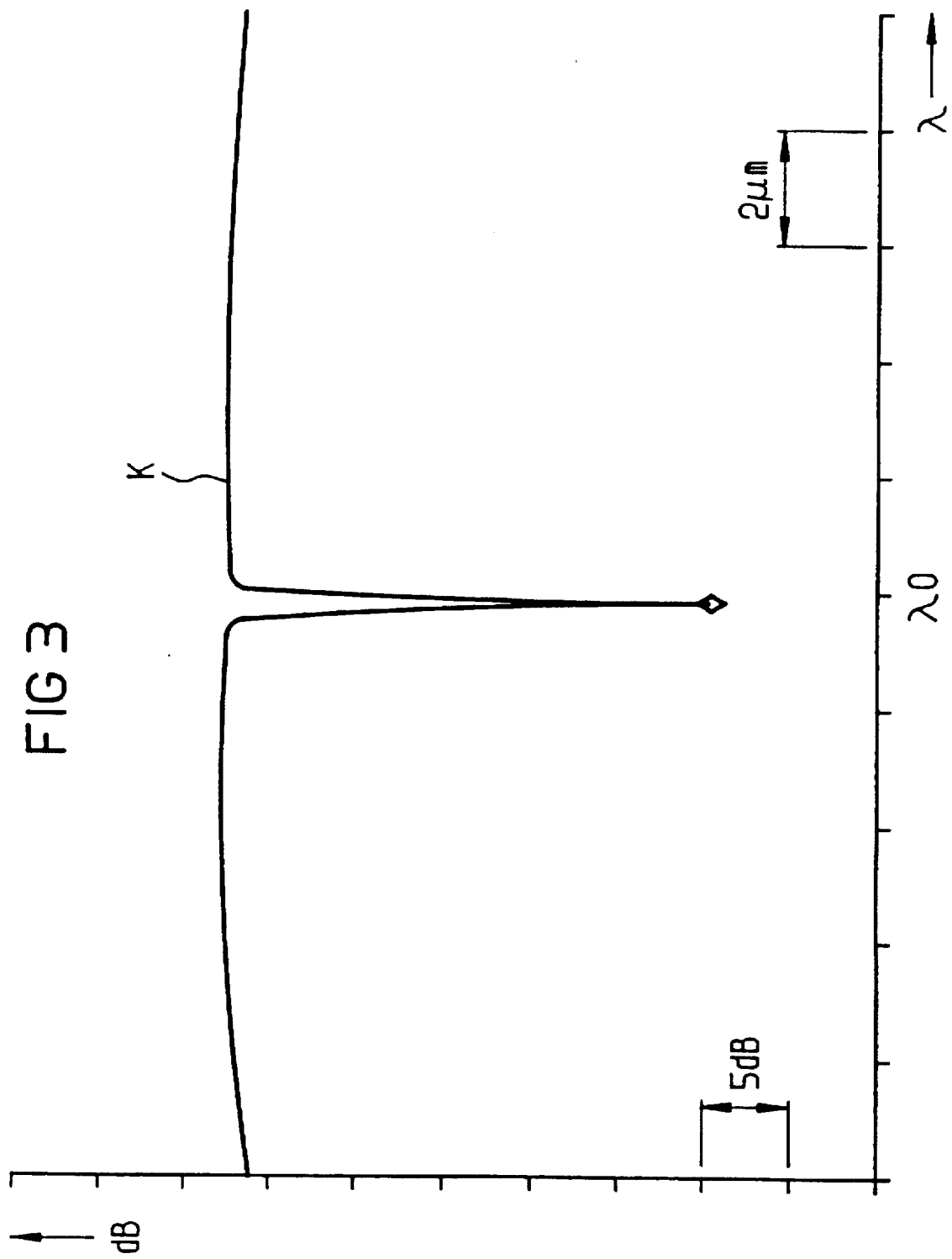

DEVICE FOR WAVELENGTH-RELATED STABILIZATION OF AN OPTICAL FILTER

BACKGROUND OF THE INVENTION

The present invention is directed to a device for the wavelength-related stabilization of an optical filter, particularly a wavelength-division multiplexer/demultiplexer.

Wavelength-division multiplex/demultiplex methods, wherein different information are transmitted simultaneously by the same fiber on frequency channels defined by different optical carrier frequencies, are being increasingly utilized for the transmission and distribution of information via optical fibers, for example glass fibers. Narrow-band optical filters are required for the multiplexing and demultiplexing of these optical channels.

It must be assured in the optical network that the frequency-related or, respectively, wavelength-related position of the channels of these filters is also constant at various nodes, for example, the filters must be absolutely stabilized to specific wavelengths.

It must be assured in an optical network that the position of the channels of these filters is also constant at various nodes, for example, the filters must be absolutely stabilized for specific wavelengths.

This stabilization can already be assured in the manufacture of filters, for example, see copending U.S. Application Ser. No. 08/765,074, (now U.S. Pat. No. 5,732,171) which is the National Phase for PCT Application PCT/DE95/00745 claiming priority from German Application P 44 22 651.9 and the PCT Application was published on Jan. 11, 1996 as WO96/00915. However, in this filter, the transmission curves can shift relative to one another during operation of the filters at various locations, for example due to different ambient temperatures. This will lead to undesirable additional losses.

A temperature-stabilization of the filters and/or the employment of a reference wavelength have already been proposed for solving this problem. The reference wavelength can be utilized as either being centrally distributed or locally distributed. The central distribution is rather unfavorable, since the optical channel thereby employed is not available for useful signal transmission or is only available therefor to a limited extent.

SUMMARY OF THE INVENTION

The present invention is based on the object of offering a new possibility for the local stabilization of the optical filter with the assistance of a reference wavelength.

This object is achieved in an improvement for a device for wavelength-related stabilization of an optical filter, particularly a wavelength-division multiplexer/demultiplexer, with the improvements comprising a Bragg grating being arranged in the proximity of the filter and means for supplying a predetermined, fixed optical reference wavelength to the Bragg grating.

As an advantage, the Bragg grating employed in the invention offers great freedom with respect to the filter band width and a high edge steepness, see, for example, U.S. Pat. No. 4,815,081, which claims priority from the same German Reference as EP 0 284 908 B1, and which U.S. Patent is incorporated herein by reference thereto. The reference wavelength that is employed can be utilized locally and/or centrally distributed.

Preferably, the advantages and developments of the inventive device occur when the means for providing the reference wavelength is an optical waveguide, such as a strip waveguide, which is integratedly formed on the substrate with the Bragg grating, either independent of the filter or with the filter. The means for supplying the optical reference wavelength can also be an optical fiber, which may be attached to the substrate with the Bragg grating.

The invention is also directed to a method for wavelength-stabilizing an optical filter having a device with a Bragg grating arranged in the proximity of the filter and means for supplying an optical reference wavelength to the Bragg grating, said method including regulating the Bragg grating to a maximum transmission and/or minimum reflection of the reference wavelength by controlling the grating constant of the grating or by controlling the grating constant of the grating to regulate the minimum transmission and maximum reflection of the reference wavelength.

Two very advantageous embodiments of the inventive device must be particularly emphasized: Durable refractive index changes can be achieved in glasses doped with germanium or other substances by irradiation with ultraviolet emission and Bragg gratings can thus be inscribed in a simple way. This was demonstrated both in planar waveguides (see article by F. Bilodau et al. entitled "Photosensitization of Optical Fiber and Silica-on-Silicon/Silica Waveguides", Opt. Lett., Vol. 18, 1993, pp. 953–955), as well as in optical fibers (see article by G. Meltz et al entitled "Formation of Bragg-Ograting in Optical Fibers by a Transverse Holographic Method", Opt. Lett., Vol. 14, 1989, pp. 823–825. Fiber Bragg gratings are already commercially available.

When the optical filter is executed as integrated-optical filter in glass material, for example as a phased array in $SiO_2$ on silicon substrates (see R. Adar et al. "Broad-Band Array Multiplexers Made with Silica Waveguides on Silicon", IEEE J. Lightwave Technology, Vol. 11, 1993, pp. 212–221), the one advantageous embodiment is comprised therein that an additional, strip-like waveguide for guiding the reference wavelength in which the Bragg grating can be inscribed in a further process step is integrated on the substrate next to the filter. The intimate and durably stable contact between filter and reference wavelength and the guarantee of the same temperature behavior of identical materials are advantageous of this embodiment. Given the operation of the Bragg grating in reflection, a further waveguide for supplying and/or carrying the reference waveguides to or, respectively, away from the substrate must be coupled to the integrated waveguide for guiding the reference wavelength, and, given operation of this grating in transmission, two additional waveguides must be coupled to the substrate, one for supplying the reference wavelength to the substrate and the other for carrying the reference wavelength away from the substrate.

In the other advantageous embodiment, a Bragg grating, which is inscribed in an optical fiber preferably composed of glass, is employed. This enables a significantly simpler structure, since the grating must merely be secured in a stable fashion with good contact in the proximity of the filter. This device can be subsequently applied to existing filters without having to alter the outlay of, for example, an integrated optical filter.

The integration of optical filters, for example phased arrays, with Bragg gratings is also possible in a semiconductor material, for example InGaAsP/InP (see M. Zirngibl et al. "Demonstration of a 15×15 Arrayed Wavelength Demultiplexer in InP", IEEE Photon. Technology Letters, Vol. 4, 1992, pp. 1250–1253) or spectrometers (see C.

Cremer et al. "Grating Spectrograph in InGaAsP/InP for Dense Wavelength Division Multiplexing", *Applied Physics Letters*, Vol. 59, 1991, pp. 627–629). However, the outlay for manufacturing high-precision Bragg gratings can be higher here (see, for example, H. Unzeitig et al, "Fabrication of Deep Bragg Gratings for DFB Lasers and Waveguide Filters by Wet and Dry Etching Processes in InGaAsP", *ECIO* 89, Paris, SPIE Col. 1141, pp. 130–134).

Other advantages and features of the invention will be readily apparent from the following description of the preferred embodiments, the drawings and claims.

BRIEF DESCRIPTION OF THE DRAWINGS

FIG. 1 is a schematic plan view of a first exemplary embodiment of the present invention;

FIG. 2 is a schematic plan view of a second exemplary embodiment of the present invention; and FIG. 3 is a transmission curve of a Bragg grating.

DESCRIPTION OF THE PREFERRED EMBODIMENTS

The principles of the present invention are particularly useful in the embodiment of FIGS. 1 and 2, which has an optical filter 1 in the form of a wavelength-division multiplexer/demultiplexer for multiplexing and/or demultiplexing a plurality $N \geq 1$ wavelength channels is respectively formed on a surface 100 of the substrate.

The multiplexer/demultiplexer 1 of FIGS. 1 and 2 is fashioned, for example, in the form of a phased array, such as mentioned and disclosed in the above-mentioned U.S. Application, and this U.S. Application is incorporated by reference for a description of forming the multiplexer-demultiplexer. When the phased array 1 is operated as a demultiplexer, a plurality of wavelength channels are supplied to the phased array 1, for example an optical fiber 11, and are spatially separated from one another in the phased array 1, after which the separated channels can be taken from individual outfeed waveguides. When, by contrast, the phased array 1 is operated as a multiplexer, the outfeed waveguide functions in an infeed waveguide for the individual channels that are merged in the phased array 1 and forwarded in common in the fiber 11.

The invention, however, is not limited to the specific structure of the optical filter, but can be applied in all optical filters.

What is critical in the inventive device for wavelength-related stabilization of the optical filter 1 is that the Bragg grating 2 is arranged in the proximity of the filter 1, a predetermined optical reference wavelength $\lambda 0$ is supplied to this Bragg grating 2, whereby a wavelength transmission characteristic of the Bragg grating 2 in reflection and/or transmission with reference to the reference wavelength $\lambda 0$ is exploited independently of the wavelength channels transmitted via the filter.

The exemplary embodiments of FIGS. 1 and 2 are configured so that the Bragg grating 2 is arranged with an optical waveguide, which is provided for guiding the reference wavelength $\lambda 0$ that is preferably a strip-like waveguide 20 in FIG. 1 and an optical fiber 20' in FIG. 2. What is to be understood by a strip-like waveguide is a waveguide that comprises a longitudinal axis along which the optical wave guided in the waveguide propagates and whereby the guided wave is laterally limited at both sides of the longitudinal axis. Examples of such strip-like waveguides are integrated striplines, such as, for example, rib waveguides or diffused-in striplines, but also optical fibers. The phased array 1, shown by way of example, is essentially composed of integrated strip-like waveguides.

In the example of FIG. 1, the Bragg grating 2 and the strip-like waveguide 20, which are provided for guiding the reference wavelength $\lambda 0$, are integrated on the surface 100 of the substrate 10.

The reference wavelength $\lambda 0$ can, for example, be supplied in an optical fiber 21 and be coupled into the integrated waveguide 20. A part of the reference waveguide $\lambda 0$ reflected by the Bragg grating 2 can be supplied to an optical detector through this fiber 21. A part of the reference wavelength $\lambda 0$ transmitted through the Bragg grating 2 can likewise be supplied to an optical detector through an optical fiber 22 coupled to the integrated waveguide.

The fiber 21 suffices by itself when only the part of the reference wavelength $\lambda 0$ reflected by the grating 2 is used. When, by contrast, the part transmitted through the grating 2 is used by itself or in addition to the reflected part, the fiber 22 must be additionally present.

Instead of the fiber 21, the fiber 22 could also be employed as a fiber for coupling the reference wavelength $\lambda 0$ into the integrated waveguide 20.

Fundamentally, an integrated strip-like waveguide of the phased array 1 itself could also be employed as an integrated waveguide 20, in which the Bragg grating 2 would then be formed. In this case, however, one channel of the optical filter 1 would be lost. It is, therefore, more expedient when the waveguide 20 provided for guiding the reference wavelength $\lambda 0$ and the Bragg grating 2 are integrated on the substrate 10 separately from the filter 1, as shown in FIG. 1.

In the exemplary embodiment of FIG. 2, by contrast, the Bragg grating 2 is formed in a waveguide 20' in the form of an optical fiber provided for guiding the reference wavelength $\lambda 0$ that is applied to the substrate 10 on which the optical filter 1 is integrated. For example, the fiber 20' is glued onto the surface 100 of the substrate 10.

The fiber 20', for example, is bent horseshoe-shaped so that indeed and outfeed are at the same side of the substrate 10 given employment of the part of the reference wavelength $\lambda 0$ transmitted through the Bragg grating 2. In this case, the Bragg grating 2 is expediently fashioned in a straight leg of the horseshoe-shaped fiber 20'.

The fiber 20' of FIG. 2 could also exhibit a course similar to the integrated waveguide 20 of FIG. 1. Conversely, the integrated waveguide 20 of FIG. 1 could also have a horseshoe-shaped course similar to the fiber 20' of FIG. 2.

The Bragg grating 2 schematically shown in FIGS. 1 and 2 usually qualitatively comprises a transmission curve, as shown in FIG. 3, for example, given fixed grating constant. FIG. 3 shows the attenuation, measured in dB, of the light transmitted through the Bragg grating 2 dependent on the wavelength $\lambda$. The illustrated typical transmission curve K exhibits a sharp minimum at the specific wavelength $\lambda 0$ that is employed as a reference wavelength. This will correspond to the maximum transmission and a minimum reflection of the grating 2.

In this case, the inventive device is advantageously operated so that the Bragg grating 2 is regulated to a minimum reflection and a maximum transmission of the constant reference wavelength $\lambda 0$ by controlling the grating constant a of the grating 2. The control of the grating constant a can occur, for example, via the temperature T of the grating 2, at which the optical filter 1 located in the proximity is also at.

In the case of a Bragg grating whose transmission curve at a specific wavelength that is to be employed as a reference wavelength λ0 does not exhibit a sharp minimum, as in the curve K of FIG. 3, but a sharp maximum corresponding to a minimum transmission and a maximum reflection at the grating 2, the grating 2 is regulated to a minimum transmission and/or maximum reflection of the constant reference wavelength λ0 by controlling the grating constant a of the grating 2. Here, too, the grating constant can be regulated by temperature of the grating 2.

Although various minor modifications may be suggested by those versed in the art, it should be understood that we wish to embody within the scope of the patent granted hereon all such modifications as reasonably and properly come within the scope of our contribution to the art.

We claim:

1. In a device for wavelength-related stabilization of an optical filter, the improvements comprising a Bragg grating being arranged in the proximity of the filter, said Bragg grating providing a condition selected from a characteristic of maximum reflection and minimum transmission and a characteristic of maximum transmission and minimum reflection for a fixed optical reference wavelength, means for supplying said fixed optical reference wavelength to the Bragg grating, and means for controlling the lattice constant of the Bragg grating by controlling the temperature applied to the grating and the filter to obtain the condition.

2. In a device according to claim 1, wherein the means is an optical waveguide provided for guiding the reference wavelength and the Bragg grating is arranged thereon.

3. In a device according to claim 2, wherein the waveguide provided for guiding the reference wavelength is a strip-shaped waveguide.

4. In a device according to claim 2, wherein the Bragg grating and the waveguide provided for guiding the reference wavelength are integrated on a substrate.

5. In a device according to claim 4, wherein the filter is an integrated optical filter fashioned on the substrate and the waveguide provided for guiding the reference wavelength and the Bragg grating are integrated on the same substrate.

6. In a device according to claim 5, wherein the waveguide provided for guiding the reference wavelength and the Bragg grating are integrated on the substrate spaced from the filter.

7. In a device according to claim 2, wherein the optical waveguide is an optical fiber and the Bragg grating is fashioned thereon.

8. In a device according to claim 7, wherein the filter is an integrated optical filter fashioned on a substrate, the optical fiber for guiding the reference wavelength and the Bragg grating are attached to the substrate.

9. A method for wavelength-related stabilization of an optical filter on a substrate having a Bragg grating having means for supplying an optical reference wavelength to the Bragg grating, said method including regulating the Bragg grating to a maximum transmission and a minimum reflection of the reference wavelength by controlling the grating constant of the grating by controlling the temperature applied to the grating and filter.

10. A method for wavelength-related stabilization of an optical filter on a substrate having a Bragg grating and means for supplying an optical reference wavelength to the grating, said method comprising regulating the Bragg grating to have a minimum transmission and a maximum reflection of the reference wavelength by controlling the grating constant of the grating by controlling the temperature applied to the grating and filter.

* * * * *